Jan. 10, 1967   C. C. ANDREWS   3,297,148
CONVEYOR STRUCTURE
Filed May 20, 1965   7 Sheets-Sheet 1

INVENTOR
Charles C. Andrews
BY
*Dominik and Stein*
ATTY'S

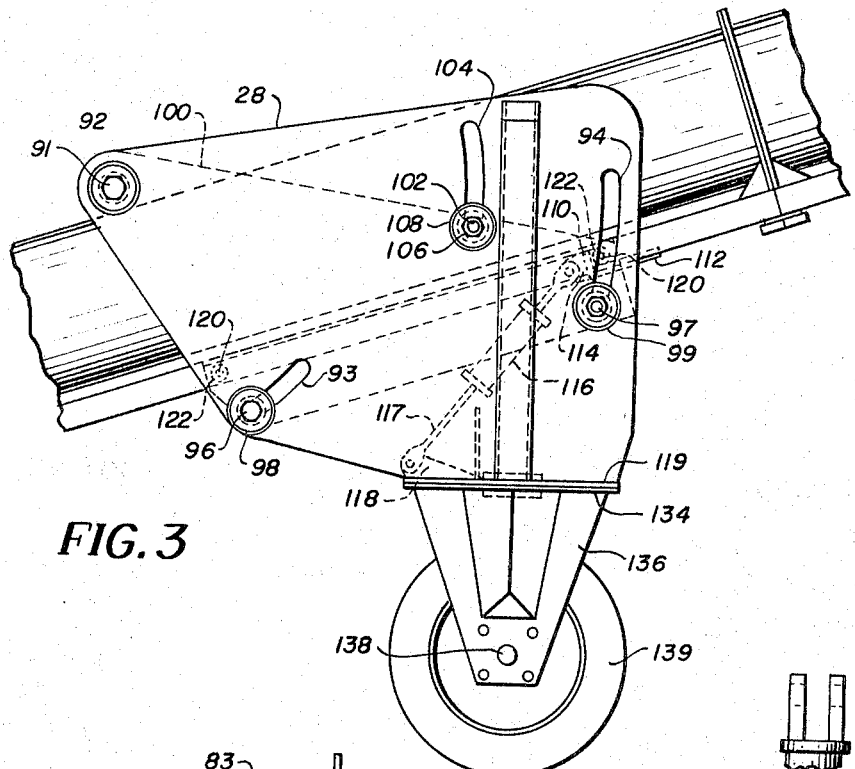
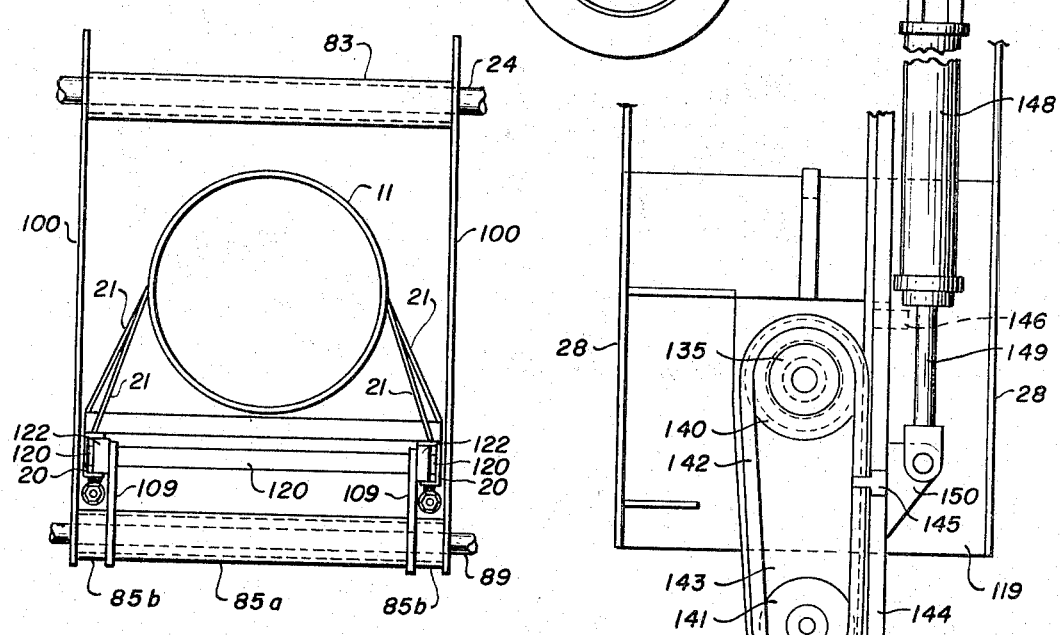

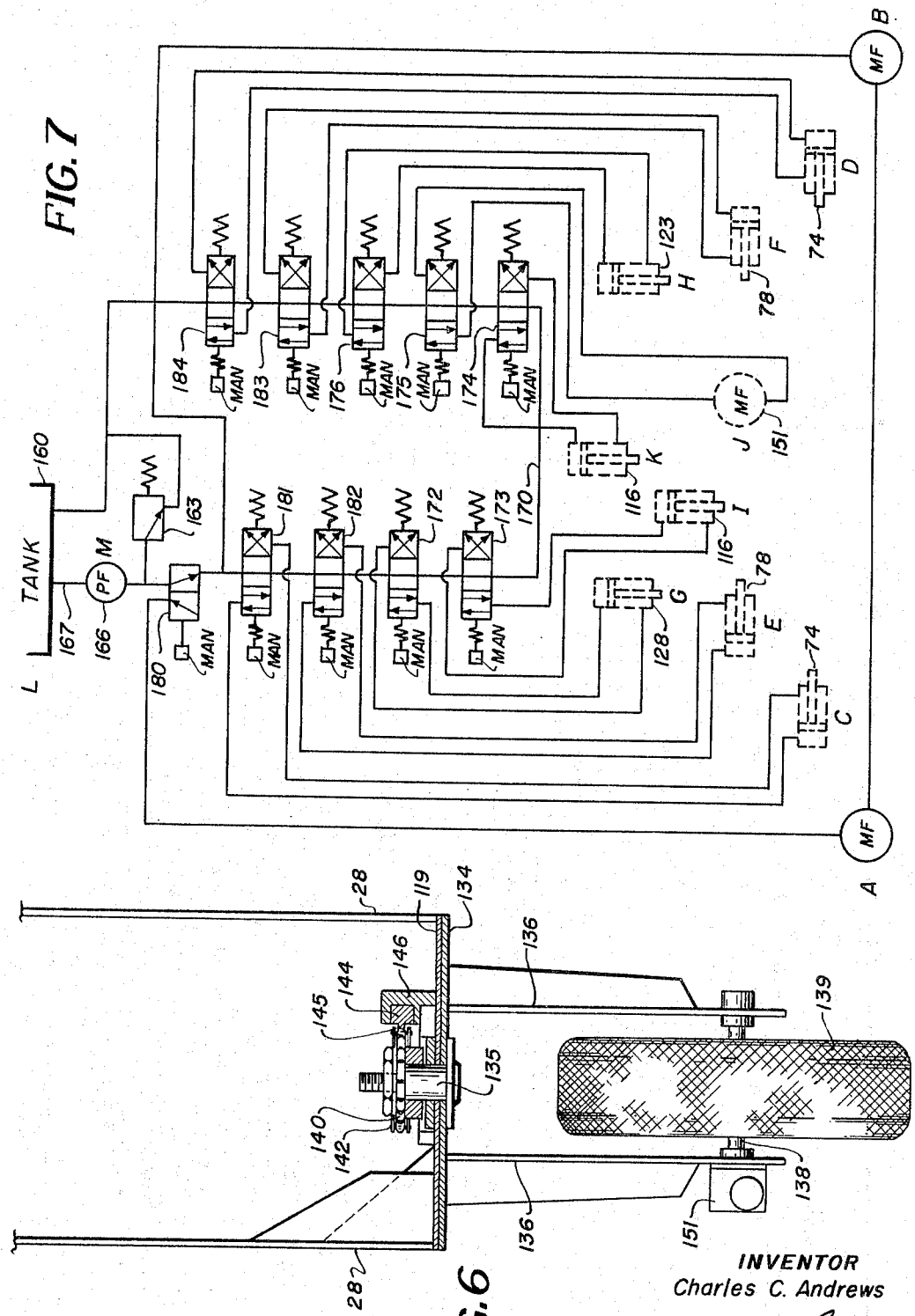

Jan. 10, 1967

C. C. ANDREWS 3,297,148

CONVEYOR STRUCTURE

Filed May 20, 1965

INVENTOR
Charles C. Andrews

BY Dominik M Stein

ATTY'S

INVENTOR
Charles C. Andrews
BY
Dominik + Stein
ATTY'S

Jan. 10, 1967  C. C. ANDREWS  3,297,148
CONVEYOR STRUCTURE
Filed May 20, 1965  7 Sheets-Sheet 7
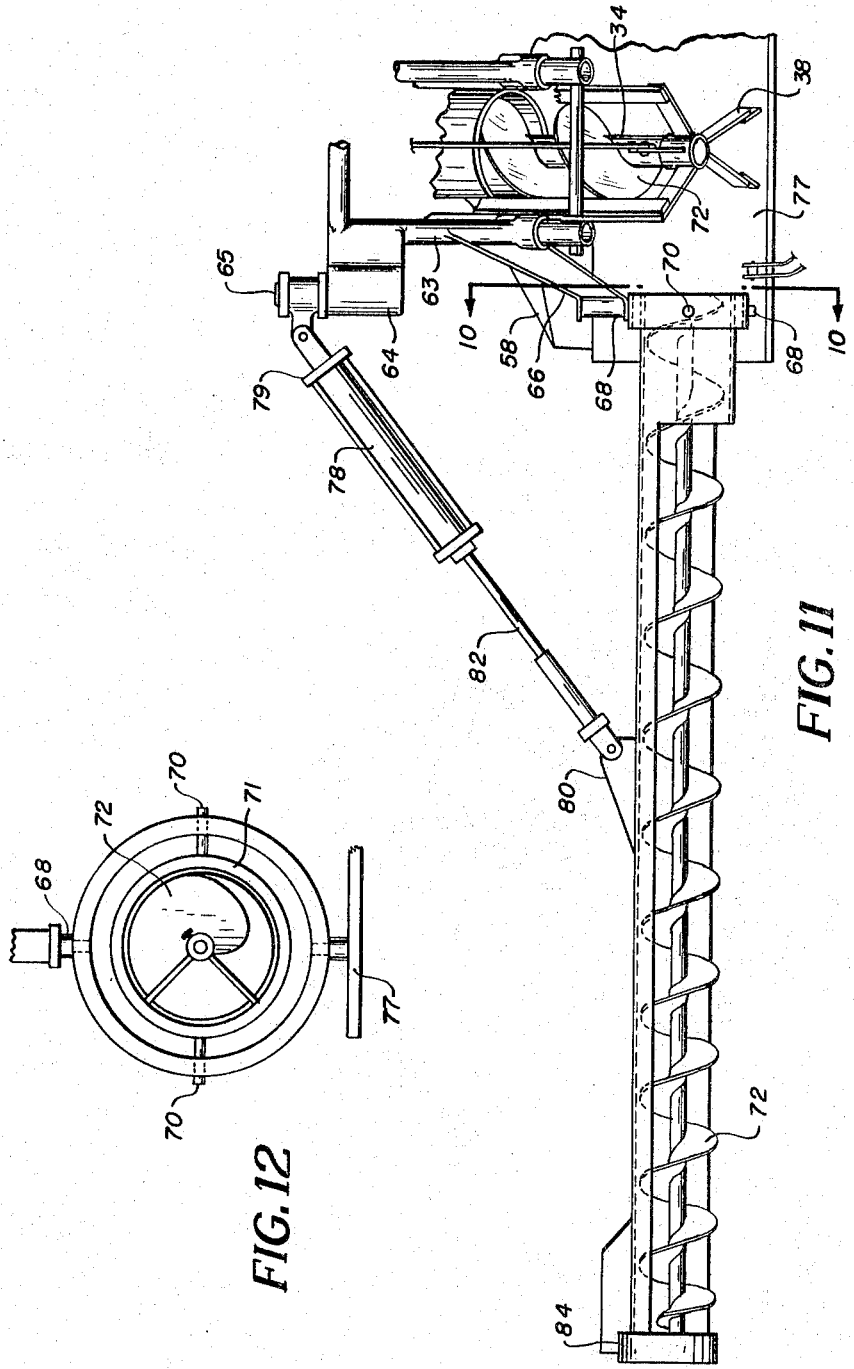
INVENTOR
Charles C. Andrews
BY
*Dominik and Stein*
ATTY'S

United States Patent Office 3,297,148
Patented Jan. 10, 1967

3,297,148
CONVEYOR STRUCTURE
Charles C. Andrews, 4 S. Sycamore,
Villa Grove, Ill. 62707
Filed May 20, 1965, Ser. No. 457,315
19 Claims. (Cl. 198—233)

This invention relates, in general, to a portable and adjustable conveyor, and more particularly to a portable and adjustable conveyor which is adapted to be motivated and adjustably positioned by a single operator and which may, in addition, be provided with laterally disposed conveyors on opposite sides of a main conveyor for conveying material to the same.

The portable and adjustable conveyor of the present invention generally comprises a main conveyor which is adjustably supported in a raised angular position by means of two pairs of arms which are coupled to the axle housing for a pair of main wheels and are adapted to be adjustably positioned to vary the height of the output end of the conveyor. A castor wheel assembly is adapted to the main conveyor in a fashion such that the main conveyor is adjustably movable longitudinally to extend, or retract, its output end, which action is also effected to raise the input end of the conveyor from the floor, and to pivot the main conveyor so as to raise the input end thereof from the floor. The castor wheel assembly is also adapted to motivate the conveyor so that it is self-powered to move the conveyor into an operable position, as desired. For rapidly transporting the conveyor from one job site to another, the conveyor can be attached to a vehicle, much like a trailer is attached, to raise the castor wheel assembly from the ground and the two main wheels used to transport it.

In accordance with a second embodiment of the invention, two laterally disposed conveyors are provided on opposite sides of the main conveyor at its input end for conveying material to it. These two laterally disposed conveyors are adapted to be pivoted both horizontally and vertically, within limits, so that they may be adjustably positioned as desired.

A gasoline engine is the prime moving force for the conveyor, and it is coupled to and operates a hydraulic pump which delivers hydraulic fluid to each of several hydraulic cylinders and motors used to operate the castor wheel assembly and, if provided, the laterally disposed conveyors, to perform the above described operations. The conveyor is therefore a self-contained unit and requires no external motivating force of any kind, except in the case of transporting it from one job site to another when more rapid transportation is generally desirable.

The conveyor with the castor wheel assembly is particularly adapted for one man operation, since it is self-motivated and can be adjustably positioned by hydraulic means. Conveyors are generally large in size and have considerable weight so that they are normally relatively difficult for one man to move about and to adjustably position them, in a desired location. In particular, in temporary storage buildings, such as quonset buildings and the like, where there are supporting rods and braces, the conveyors must be constantly repositioned to avoid them. Also, ventilator shafts are normally placed on the floor, across the width of the building, to provide air circulation through the grain and the like, which is piled on top of them. These shafts must also be avoided and hence the conveyor must be repositioned. As will be apparent from the description which follows, the conveyor of the present invention can be easily maneuvered, by one man, to avoid any obstacles. Considerable difficulty is also generally encountered when unloading grain and the like from such a building with a conveyor having laterally disposed conveyors at the input end thereof. Considerable hand shoveling is generally required and the conveyor must be constantly repositioned so that the supporting rods and ventilator shafts are avoided.

With laterally disposed conveyors adapted to the main conveyor, in accordance with the present invention, quonset buildings, as well as other types of buildings, can be easily and quickly unloaded since the main conveyor can be adjustably positioned to clear the grain and the like from in front and on top of the ventilator shafts and the laterally disposed conveyors can be adjustably positioned to avoid the supporting rods, without having to reposition the conveyor. Also, since the conveyor is a self-contained unit, one man can easily handle the entire operation.

It will also be apparent from the description which follows, that the conveyor is applicable for unloading grain from the ground, or any place, where it may be temporarily stored since it can be adjustably positioned, as desired. Rocks, gravel and the like can therefore be avoided, as for example, when picking up grain which has been temporarily stored on the ground, by merely raising the input end from the ground.

It is therefore an object of the present invention to provide a new and improved portable and adjustable conveyor.

It is another object of the invention to provide a new and improved portable and adjustable conveyor which is self-motivated and which is angularly positionable. In this respect, it is contemplated that the conveyor be easily maneuverable by one man.

It is another object of the invention to provide a portable and adjustable conveyor of the last mentioned type which, in addition, has two laterally disposed positionable adjustable conveyors that can be easily maneuvered by one man.

It is still another object of the invention to provide a portable and adjustable conveyor of the last mentioned type, wherein the main conveyor is angularly adjustable to vary the height of its output end and is longitudinally adjustable to extend, or retract, its length. In this respect, it is further contemplated that the main conveyor be pivotal so that its input end can be raised, or lowered, as desired, within limits. It is also contemplated that the conveyor be self-motivating so that it can be easily maneuvered. And still further, it is contempated that the conveyor be easily operated by one man.

It is a still further object of the invention to provide a portable and adjustable conveyor which is rugged in construction so that maintenance cost is at a minimum. In this respect, it is contemplated that the construction be such that the conveyor can be fabricated in sizes and lengths, as requested, within limits, with a minimum of effort.

It is still another object to provide a portable and adjustable conveyor which is generally hydraulically operated and which has a coordinated hydraulic control system which may be controlled from a single control position.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 3 is a partial side view of the conveyor of FIG. 1, illustrating the castor wheel assembly;

FIGURE 4 is a view generally illustrating the construction of the castor wheel assembly, as viewed from the input end of the conveyor;

FIGURE 5 is a view illustrating the turning mechanism of the castor wheel assembly;

FIGURE 6 is a partial front view of the castor wheel assembly;

FIGURE 7 is a schematic drawing of the hydraulic system of the conveyor;

FIGURE 11 is a partial end view of the input end of the conveyor of FIG. 1, partially cut away, to illustrate the screw type auger of one of the laterally disposed conveyors; and FIGURE 12 is a sectional view taken along lines 10—10, illustrating the pivotal connection of the laterally disposed conveyors.

Similar reference characters refer to similar parts throughout the several views of the drawings.

Figures 1, 2:
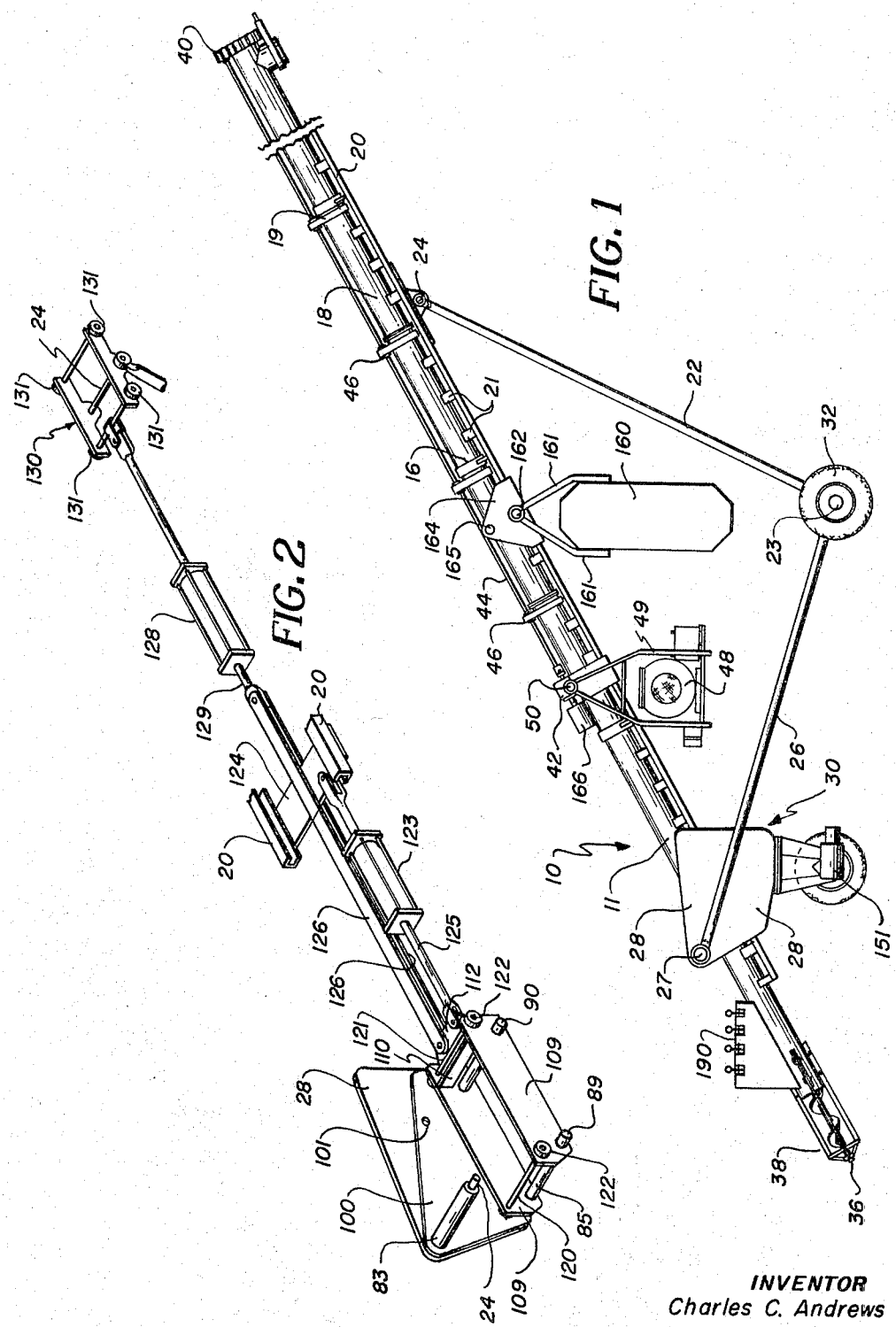
FIGURE 1 is a side view of a portable and adjustable conveyor exemplary of the present invention.
FIGURE 2 is a partial perspective view of the conveyor of FIG. 1, illustrating the adjustable positioning means of the conveyor.

Referring now to the drawings, in FIG. 1 there is shown a conveyor 10 exemplary of a first embodiment of the invention having a main conveyor 11 which comprises an elongated tube which is formed of sections, such as sections 16 and 18, which are preferably of a standard diameter and length so that the overall length and the diameter of the main conveyor can be easily modified, within limits, according to customer requests. The ends of the tube sections are flanged, as at 19, and provided with bolt receiving apertures so that they may easily be secured to one another. A pair of laterally opposed inwardly facing channel members 20 are disposed beneath the tube sections forming the main conveyor 11 and are rigidly secured thereto by means of support plates 21 whose opposite ends are connected to the tube sections and the channel members. The channel members 20 provide rigidity and also serve as a track and guide for a roller dolly 130 (FIG. 2) which is used to raise and lower the main conveyor 11 to change the elevation, in a manner described more fully hereinafter.

Figure 8:
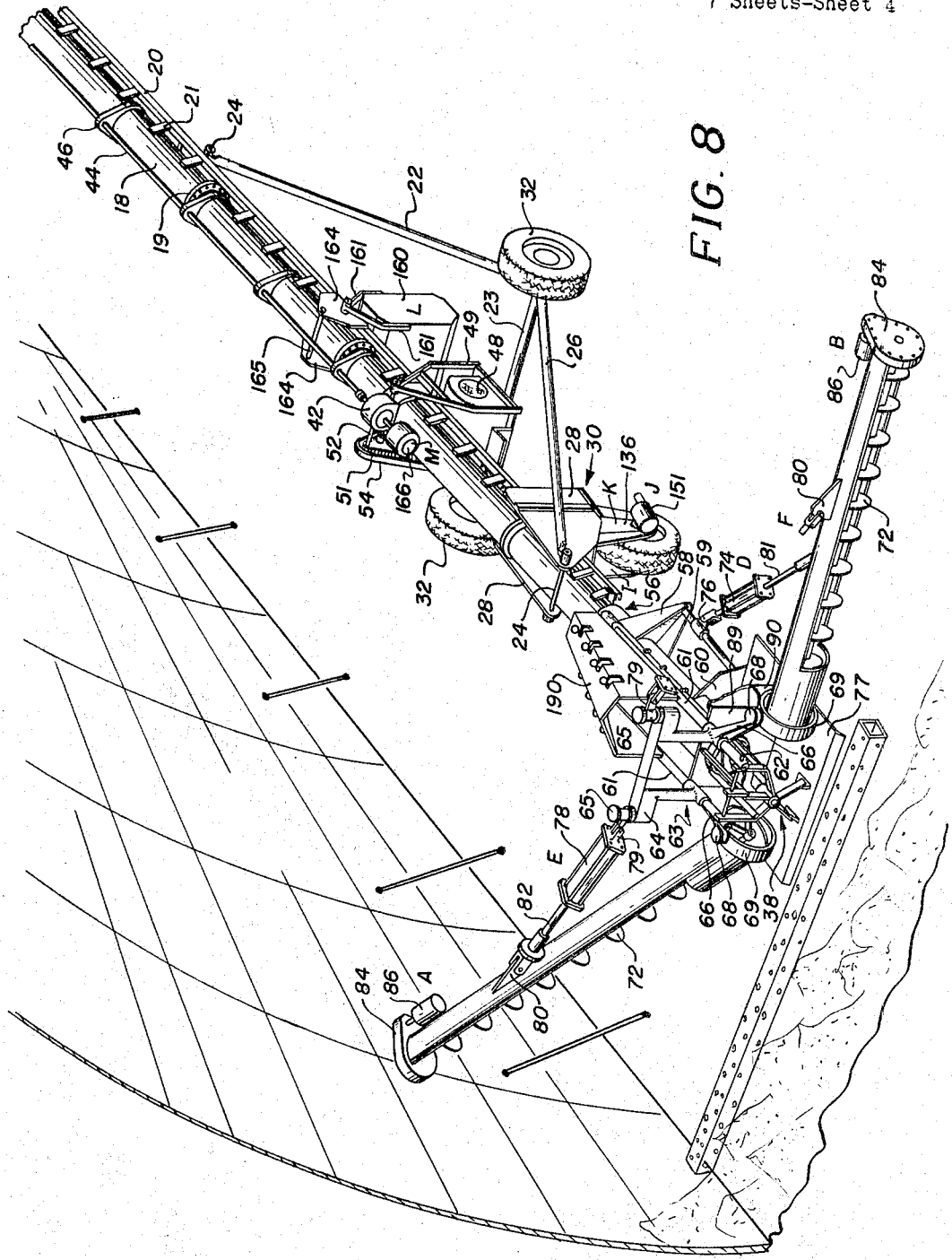
FIGURE 8 is a perspective view of the conveyor of FIG. 1, with laterally disposed conveyors adapted thereto, in accordance with a second embodiment of the invention, illustrating its use in unloading grain and the like from a quonset building.

The main conveyor 11 is supported in an angular elevated position by means of arms 22 and 26, which may be best seen in FIG. 8. The opposite ends of the arms 22 are pivotally connected to a shaft 24 which is fixedly retained by the dolly 130 and to an axle shaft or sleeve 25. The opposite ends of the arms 26 are pivotally connected to the same sleeve 25 and to a shaft 27 fixedly secured within apertures formed in two side plates 28 of a castor wheel assembly 30. The axle sleeve 25 retains an axle 23 for a pair of wheels 32 which may be used to transport the conveyor 10.

Enclosed within the tube sections is an auger-type screw 34 which also may be formed in standard sizes and lengths. The screw 34 is supported at the input end of the conveyor 11 within a bearing assembly 36 which is supported by a bearing support frame 38 which is generally open to allow material to flow to the screw 34. At the output end, the screw 34 is supported by a bearing assembly (not shown) retained within a gear box 40. The screw 34 also has a hardened and ground stub tooth steel gear (not shown) fixedly secured to it which is drivingly engaged by means of a roller chain with a similar gear (not shown), retained within the gear box 40. This latter gear is coupled to a drive shaft 44 extending from a gear box 42 and supported by self-aligning ball bearings, at each of a number of drive shaft supports 46 spaced along the length of the conveyor 11.

Power to drive the conveyor 11 is provided by a gasoline engine 48 mounted on a frame 49 which is pivotally hung below the conveyor by means of a pivot shaft 50 so that the engine 48 is level, regardless of the position of the conveyor 11. Power from the engine 48 is coupled to the gear box 42 by means of a multiple V-belt drive 51 coupling the engine shaft and a drive shaft 52. A chain guard 54 is provided to prevent someone from accidentally getting caught in the drive.

Referring now to FIGS. 2–6, the side plates 28 of the castor wheel assembly 30 are fixedly secured to one another, in spaced relation, by means of spacers 83, 85 and 87 which are placed between them on the shafts 24, 89 and 90, respectively. The ends of the shaft 24 are passed through apertures formed in the side plates 28 and are threaded to receive locking nuts 91. An enlarged washer 92 is secured between the nuts 91 and the side plates 28. The ends of the shafts 89 and 90 are passed through elongated crescent shaped apertures 93 and 94, respectively, formed in the side plates 28 and are threaded to receive locking nuts 96 and 97. Enlarged washers 98 and 99 are also secured between the locking nuts and the side plates.

A smaller substantially triangular-shaped side plate 100 is secured between each of the side plates 28, in spaced relation, by means of the same spacers 83, 85 and 87. The side plates 100 have correspondingly positioned apertures therein for receiving the ends of the shafts 24, 89 and 90, as well as apertures 101 for receiving the ends of a shaft 102 which are passed through them and secured within crescent-shaped apertures 104 formed in the side plates 28. The shafts 102 are threaded to receive locking nuts 106 and enlarged washers 108 are secured between the nuts 106 and the side plates 28.

Inwardly of the side plates 100 are a pair of rectangular shaped frame members 109 which are also secured in spaced relation to one another, at one end, by means of the spacer $85_a$ and in spaced relation to the side plates 100 by means of the spacers $85_b$, both of which are fixedly secured to the members 109 and constitute the spacer 85. Similar spacers are arranged at the other end for the shaft 90. A cross member 110 also is secured between the frame members 109 and has a connecting bar 112 secured thereto which extends perpendicularly outward toward the output end of the conveyor 11 and an apertured flange 114 secured to its opposite side which provides a pivot anchor point for one end of a hydraulic cylinder 116. The other end of the hydraulic cylinder 116 is pivotally secured to an upstanding apertured flange 118 fixedly secured to a bottom plate 119 fastened to the lower edges of the side plates 28. A pair of shafts 120 and 121 are passed through apertures formed at the front and rear of the frame members 109, which shafts have roller wheels 122 rotatably secured thereto that are adapted to ride in the channel of the channel members 20 secured beneath the tube sections of the main conveyor 11.

Secured to the cross bar 112 is one end of a hydraulic cylinder 123, the other end of which is secured to a cross member 124 fixedly secured between the channel members 20. Also secured to the cross bar 112 are the ends of a pair of spaced members 126, the other ends of which are secured to the piston 129 of a hydraulic cylinder 128. The cross member 124, it may be noted, is arranged to slide between the spaced members 126. The other end of the hydraulic cylinder 128 is coupled to a dolly 130 having roller wheels 131 which are adapted to ride in the channel of the channel members 20. With this arrangement, the conveyor 11 can be extended and retracted; raised and lowered; extended and raised or lowered; and retracted and raised or lowered. This operation is as follows. When the hydraulic cylinder 123 is operated to expel its piston 125, force is exerted upon the cross member 124, which force acts on the conveyor 11 to extend its length by moving the conveyor 11 longitudinally to draw the input end closer to the castor wheel assembly 30. It may be noted that this movement also lifts the input end of the conveyor 10 above the level of the ground, or floor. When the conveyor 10 is being used to empty grain from a building wherein ventilator shafts have been placed on the floor under the grain, the input end can be maneuvered in the above described manner to avoid them, as well as other obstructions, so that very little hand shoveling is required.

It may also be noted that the dolly 130 is held in a fixed position when the hydraulic cylinder 123 is operated so that it rides in the channel members 20. The angular position of the conveyor 11 therefore does not change.

When the hydraulic cylinder 128 is operated to expel its piston 129, a force is exerted upon the dolly 130 to push it forward toward the output end of the conveyor 11. When the dolly 130 moves forward, the angle between the arms 22 and the arms 26 is increased and the output end is therefore lowered.

When the pistons 125 and 129 are retracted, the opposite movements of course, occur so that the conveyor 11 is retracted and raised.

It is apparent that when the piston 125 is expelled or retracted to extend or retract the conveyor 11, the output end can be simultaneously raised or lowered by operating the hydraulic cylinder 128 to expel or retract its piston 129. It may therefore be noted that the conveyor 11 can be easily and rapidly adjustably positioned, as desired, merely by operating one or the other, or both, of the hydraulic cylinders 123 and 128 accordingly.

Referring now to FIGS. 3, 5 and 6, a plate 134 having a pair of axle support plates 136 depending downwardly therefrom in spaced relation is pivotally secured by means of a shaft 135 to the bottom plate 119. The axle support plates 136 support the axle 138 of a wheel 139. As can be best seen in FIGS. 5 and 6, the shaft 135 has a gear 140 fixed to it which is drivingly coupled by means of a chain 142 to a gear 141 rotatably secured to an extended member 143. A shaft 144 having a chain engaging member 145 thereon is slidably retained within a pair of guide members 146 in a manner such that the chain engaging member 145 is engaged with one of the links in the chain 142. The piston 149 of a hydraulic cylinder 148 is secured to a flange 150 on the shaft 144 and is adapted to move the shaft 144 back and forth as the piston 149 is retracted and expelled. This motion is transferred to the shaft 135 to turn the wheel 139 so that the conveyor 10 can be steered when moving.

In FIGS. 1 and 6, it can be seen that a hydraulic motor 151 is secured to one of the axle support plates 136. Motor 151 is gear coupled to the axle 138 of the wheel 139 to drive the same so that the wheel 139 can be used to motivate the conveyor 10. It can therefore be seen that the wheel 139 is arranged to both motivate the conveyor 10, and to steer it, as it is being moved.

Referring again to FIG. 3, it can be seen that the hydraulic cylinder 116 can also be used to raise the input end of the conveyor 10. When the hydraulic cylinder 116 is operated to retract its piston 117, it effectively forces the wheel 139 to roll backward. In so doing, the shafts 89, 90 and 102 are caused to slide within the crescent-shaped apertures 93, 94 and 104, respectively, which action it can be seen effectively tips the input end of the conveyor 10 upwardly and the output end downwardly. Expelling the piston 117, of course, results in the opposite effect. The input end of the conveyor 11 can therefore be adjustably positioned by operating the hydraulic cylinder 116, as well as by operating the hydraulic cylinders 123 and 128.

The hydraulic circuitry for the conveyor 11 is shown schematically in FIG. 7 in solid lines. The dotted lines illustrate the additional hydraulic apparatus which is included when the laterally disposed conveyor described hereinafter are adapted to the conveyor 11. The hydraulic circuitry includes a reservoir or tank 160 which, as can be best seen in FIG. 1, is pivotally suspended below the conveyor 11 by means of arms 161 which are secured to the tank 160 and pivotally supported by a pair of shafts 162. The shafts 162 are fixedly secured to support plates 164 on opposite sides of the conveyor 11. The lower ends of the support plates 164 are fixedly secured to the channel members 20 and the upper ends thereof are held in spaced relation by means of a shaft 165.

A hydraulic pump 166 is coupled to the tank 160 by hydraulic lines (represented by line 167) and is drivingly coupled to the end of the drive shaft which drives the auger screw of conveyor 11. The same source of power, gasoline engine 48, therefore provides power to operate both the auger screw of conveyor 11 and the hydraulic pump 166. A pressure relief valve 163 is coupled from the output of hydraulic pump 166 to a return line 168 to the tank 160, which valve provides protection to the other hydraulic circuitry.

Included in a hydraulic line 170 extending from the output of the hydraulic pump 166 to the return line 168 are a number of three position, four way open center directional valves 172–176. The valves 172–176 are coupled by hydraulic lines to respective ones of the hydraulic cylinders 116 and 128 and to the hydraulic motor 151, and are manually operated to control the operation of its associated hydraulic cylinder or motor. The valves 172–176 are all mounted on, and operated from, a control panel 190 which is mounted on top of the conveyor 11, as can be seen in FIG. 1. The conveyor 11 can therefore be maneuvered, steered and motivated, from one central control position, so that its operation can be easily controlled by only one operator.

Figure 9:
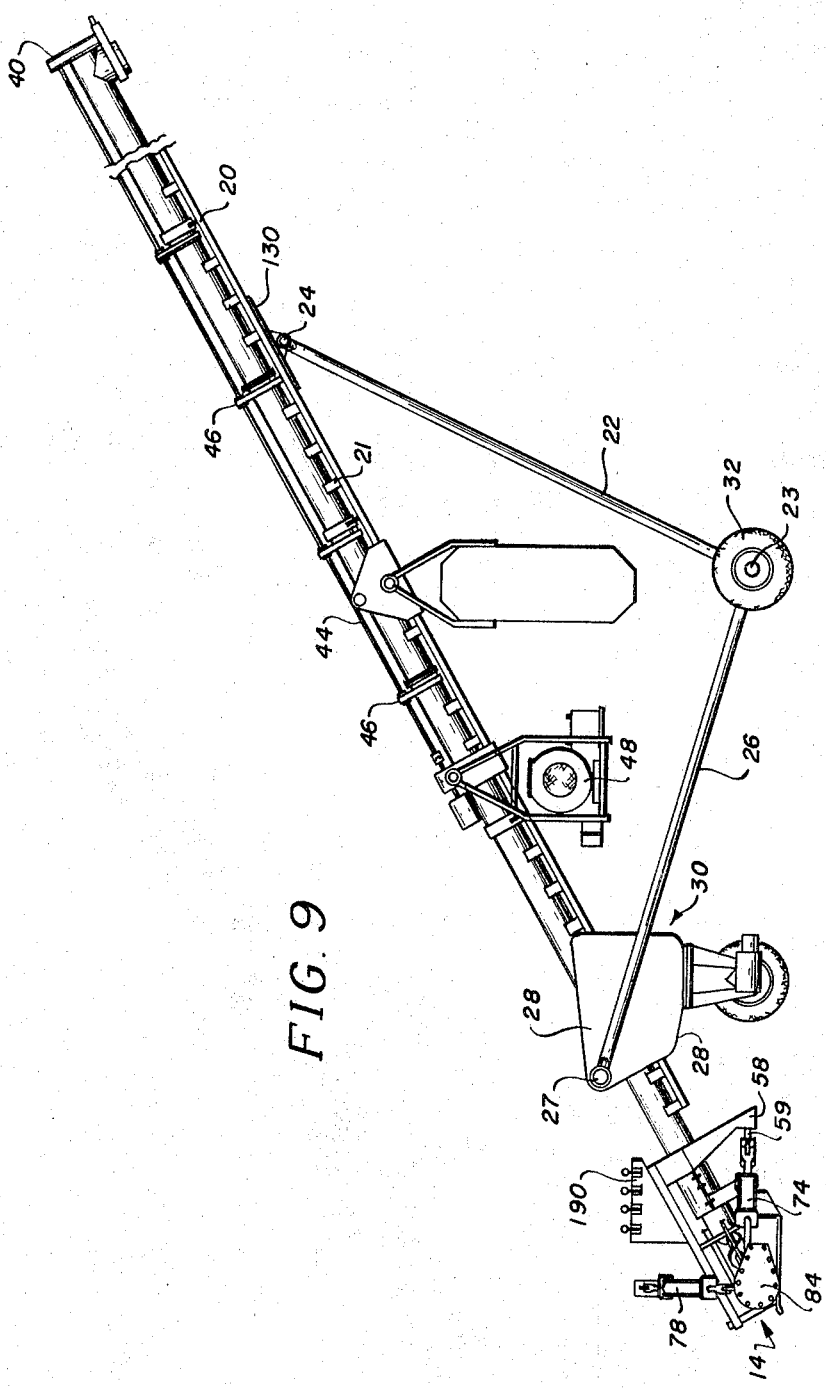
FIGURE 9 is a side view of the conveyor of FIG. 8.
Figure 10:
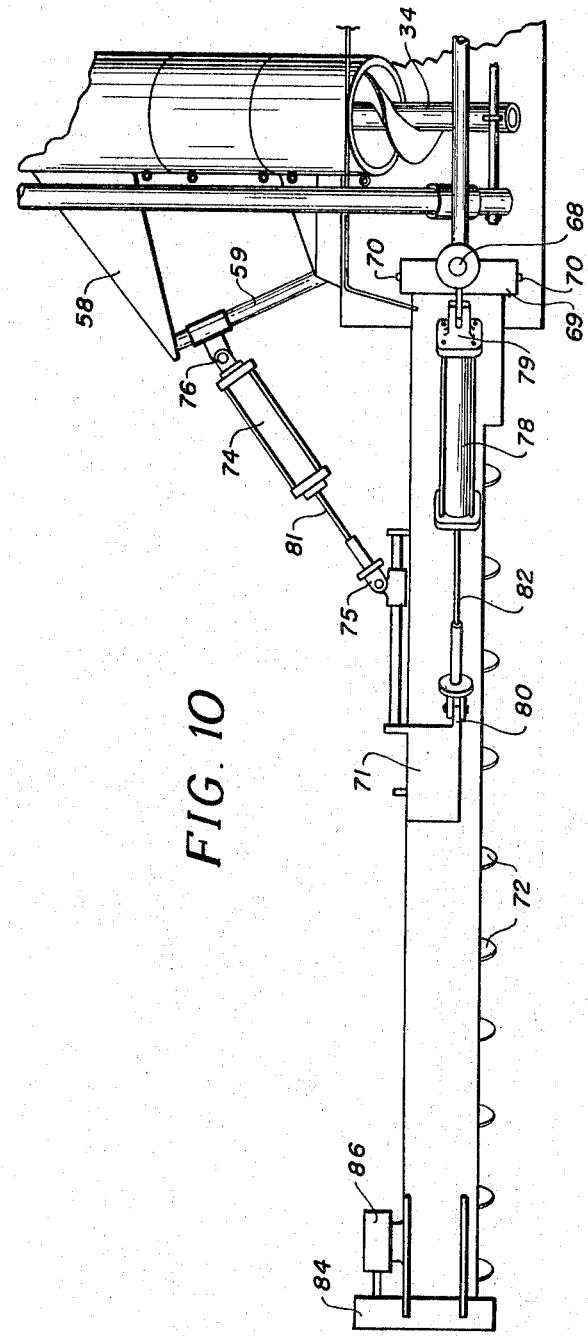
FIGURE 10 is a partial top view of the input end of the conveyor of FIG. 8, illustrating the attachment of one of the laterally disposed conveyors.

As indicated above, a pair of adjustably positionable laterally disposed conveyors 12 and 14 can be adapted to the input end of the conveyor 11, as illustrated in FIGS. 8 and 9. The assembly for the conveyors 12 and 14 is arranged to be easily adapted to a conveyor 11 and includes a tubular-shaped assembly 56 comprising two divided parts which when fitted together substantially correspond in diameter to that of the tube sections of the conveyor 11. The assembly 56 is secured to the conveyor 11 at its input end, by clamping it over, or around, the tube section. A pair of shaft supports 58 extend from the assembly 56 and secure one end of a shaft 59, the other end of which is fixedly secured to and supported by a shaft supporting plate 60 which extends outwardly from the assembly 56 to which it is secured. A similar shaft and supporting members are provided on the opposite side of the conveyor 11.

A pair of shafts 61 are secured to opposite sides of the assembly 56 and extend rearwardly of the end of the conveyor 11 where they are supported by means of a shaft 62 which is, in turn, supported by means of the bearing support frame 38. A substantially U-shaped support frame 63 having offset conveyor support arms 64 which support a pair of vertically extending pivot pins 65 and outwardly extending portions 66 which support a pair of vertically extending pivot pins 68 has its arms 66 fixedly secured to the shafts 61. A pair of conveyor support rings 69 are pivotally supported in a vertical position by the pivot pins 68. The pair of laterally extending conveyors 12 and 14 are pivotally secured within the conveyor support rings 69 by means of pivot pins 70 which extend through them and are fixedly secured to the housing 71 for the screw type augers 72. As can be best seen in FIG. 12, the laterally extending augers 12 and 14 are therefore arranged to pivot horizontally back and forth, as well as vertically up and down, by means of the pivot pins 68 and 70, respectively, so that they may be adjustably positioned as desired, within limits.

Positioning of the conveyors 12 and 14 horizontally is controlled by means of hydraulic cylinders 74 which are pivotally secured to the shafts 59 by means of hinge assemblies 76 and to the housings 71 for the augers 72 by means of hinge assemblies 75 (FIG. 8). Positioning of the conveyors 12 and 14 vertically is controlled by means of hydraulic cylinders 78 which are pivotally secured to pivot support assemblies 79 secured by the pivot pins 65 and to the upstanding flanges 80 fixedly secured to the housing 71. It can be seen that by operating the hydraulic cylinders 74 to expell and retract their pistons 81, the conveyors 12 and 14 are caused to pivot back and forth, about the pivot pins 68, and that by operating the hydraulic cylinders 78 to expell and retract their pistons 82, the conveyors 12 and 14 are caused to pivot up and down, about the pivot pins 70.

Secured to the ends of each of the housings 71 for the conveyors 12 and 14 is a gear box 84 which may be of the same construction as the gear box 40 secured to the end of the main conveyor 11, for driving the augers 72 of the conveyors 12 and 14. Power is supplied to the gear boxes 40, by means of hydraulic motors 86.

A platform 77 is secured at its one end to the outwardly extending plates 60 secured to the assemblies 56. An upstanding plate 89 is secured to the platform 77 and has an aperture therein for receiving the end of the conveyor 11. The platform 77 and the plate 89 function to support the input end of the conveyor 10 from the floor. The platform 77 also supports the bearing support frame 38. A pair of canvas guards 90 are secured to a plate 89 and to the rings 69 to direct the grain or the like from the augers 72 to the main auger 34 of the conveyor 11.

Referring again to FIG. 7 which illustrates the hydraulic circuitry for the conveyor, it may be seen that the hydraulic valves 180–184 are coupled into the line 170 and are, in turn, coupled to the hydraulic motors 86 and the hydraulic cylinders 74 and 78. The valves 180–184 are also mounted in, and manually operated from, the central control panel 190 which, in this case, is mounted atop the assembly 56.

From the above description it can be seen that the maneuverability of the conveyor, in the manner described above, makes it particularly applicable to empty grain from a building having supporting rods or braces and ventilator shafts placed on the floor under the grain. The input end with the laterally disposed conveyors 12 and 14 attached can be maneuvered in the above described manner to pick up the grain around and on top of the ventilator shafts so that very little hand shoveling is required. Also, the conveyors 12 and 14 can be adjustably positioned horizontally and/or vertically to avoid the supporting rods, or other obstructions, so that the entire conveyor assembly does not have to be constantly repositioned to avoid them. Each of these operations can be easily performed by only one man so labor costs can be reduced considerably. The conveyor 10 can also be moved, and steered, into a desired position, by means of the driveable and steerable castor wheel assembly 30 so that the conveyor 10 is particularly adapted to one man operation.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A conveyor structure comprising a main conveyor and a pair of secondary conveyors laterally disposed on opposite sides of said main conveyor at its input end, means secured to said pair of secondary conveyors which are operable to individually pivot said secondary conveyors horizontally and vertically to a desired position, a pair of ground wheels, a first and a second pair of arms each having one end thereof pivotally secured to an axle shaft for said ground wheels, the opposite ends of said first and second pair of arms being pivotally coupled to said main conveyor in spaced relation so as to form a triangular relationship with said main conveyor, means for increasing and decreasing the length of one side of said triangle to angularly adjust the position of said main conveyor, and a castor wheel assembly adapted to said main conveyor including means for extending and retracting said main conveyor.

2. A conveyor structure comprising a main conveyor and a pair of secondary conveyors laterally disposed on opposite sides of said main conveyor at its input end, means secured to said pair of secondary conveyors which are operable to individually pivot said secondary conveyors horizontally and vertically to a desired position, a pair of ground wheels, a first and a second pair of arms each having one end thereof pivotally secured to an axle shaft for said ground wheels, the opposite ends of said first and second pair of arms being pivotally coupled to said main conveyor in spaced relation so as to form a triangular relationship with said main conveyor, means for increasing and decreasing the length of one side of said triangle to angularly adjust the position of said main conveyor, and a castor wheel assembly coupled to said main conveyor, said castor wheel assembly being adapted to extend and retract said main conveyor and including means for motivating and steering said conveyor structure.

3. A conveyor structure comprising a main conveyor and a pair of secondary conveyors laterally disposed on opposite sides of said main conveyor at its input end, means secured to said pair of secondary conveyors which are operable to individually pivot said secondary conveyors horizontally and vertically to a desired position, a pair of ground wheels, a first and a second pair of arms each having one end thereof pivotally secured to an axle shaft for said ground wheels, the opposite ends of said first and second pair of arms being pivotally coupled to said main conveyor in spaced relation so as to form a triangular relationship with said main conveyor, means for increasing and decreasing the length of one side of said triangle to angularly adjust the position of said main conveyor, and a castor wheel assembly coupled to said main conveyor including a wheel, means coupled to said wheel for driving said wheel to motivate said conveyor structure, means operable to steer said castor wheel assembly and means for pivoting said castor wheel assembly to raise and lower the input end of said conveyor structure.

4. A conveyor structure comprising a main conveyor and a pair of secondary conveyors laterally disposed on opposite sides of said main conveyor at its input end, a first and a second pair of hydraulic cylinders coupled respectively to said pair of secondary conveyors, said first and second pair of hydraulic cylinders being operable respectively to horizontally and vertically pivot said secondary conveyor, a first frame member slidably secured to said main conveyor, a pair of ground wheels, a first and a second pair of arms each having one end thereof pivotally secured to an axle shaft for said ground wheels, the opposite ends of said first pair of arms being pivotally coupled to said main conveyor and the opposite ends of said second pair of arms being pivotally secured to said frame member, said first and second pair of arms being in spaced relation so as to form a triangular relationship with said main conveyor; hydraulic cylinder means coupled to said frame member adapted to slide said frame member longitudinally along the length of said main conveyor for increasing and decreasing the angle formed by said first and second pair of arms to angularly adjust the position of said main conveyor, a second frame member adapted to slidably secure said main conveyor therein, a hydraulic cylinder coupled to said second frame member and to said main conveyor which is operable to slide said main conveyor within said second frame member to extend and retract said main conveyor, a hydraulic pump coupled to said hydraulic cylinders, valve means included in the coupling between said pump and said cylinders which are individually operable to control said cylinders, and means for operating said hydraulic pump.

5. A conveyor structure comprising a main conveyor and a pair of secondary conveyors laterally disposed on opposite sides of said main conveyor at its input end, a first and a second pair of hydraulic cylinders coupled respectively to said pair of secondary conveyors, said first and second pair of hydraulic cylinders being operable respectively to horizontally and vertically pivot said secondary conveyor, a frame member slidably secured to said main conveyor, a pair of ground wheels, a first and a second pair of arms each having one end thereof pivotally secured to an axle shaft for said ground wheels, the opposite ends of said first pair of arms being pivotally coupled to said main conveyor and the opposite ends of said second pair of arms being pivotally secured to said frame member, said first and second pair of arms being in spaced relation so as to form a triangular relationship with said main conveyor; hydraulic cylinder means coupled to said frame member adapted to slide said frame member longitudinally along the length of said main conveyor for increasing and decreasing the angle formed by said first and second pair of arms to angularly adjust the position of said main conveyor, a castor wheel assembly adapted to said main conveyor, said castor wheel assembly including a second frame member adapted to slidably secure said main conveyor therein, a hydraulic cylinder coupled to said second frame member and to said main conveyor which is operable to slide said main conveyor within said second frame member to extend and retract said main conveyor, coupling means including valve means coupling said hydraulic cylinder to said hydraulic pump.

6. A conveyor structure, as claimed in claim 5 wherein said castor wheel assembly further includes driving means for driving the wheel thereof to motivate said conveyor structure and steering means for steering said wheel assembly.

7. A conveyor structure, as claimed in claim 6 wherein said driving means includes a hydraulic motor means coupled to the wheel of said castor wheel assembly and coupling means including valve means coupling said hydraulic motor means and said hydraulic pump.

8. A conveyor structure, as claimed in claim 6 wherein said steering means includes a gear secured to a shaft supporting the wheel thereof, a driven gear rotatably supported, a chain driving engaged with said gears, a shaft having a chain engaged lug thereon adapted to be moved transversely to cause said chain to rotate said gears and means for moving said shaft transversely.

9. A conveyor structure, as claimed in claim 8, comprising a hydraulic cylinder which is coupled to said hydraulic pump.

10. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a pair of laterally spaced plate members disposed on opposite sides of said tube which are adapted to support a wheel assembly below said tube and a second slidable frame between said plate members, said second slidable frame being disposed within said channel members and adapted to slidably support said tube; a pair of arms extending from said wheels and pivotally connected to said first slidable frame; a pair of arms extending from said wheels and pivotally connected to said plate members; means fixedly secured to said first and second slidable frames for angularly adjusting the position of said tube; means fixedly secured to said second slidable frame and to said channel members for longitudinally extending and retracting said tube; and means coupled to said conveyor screw for rotating it.

11. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a pair of laterally spaced plate members disposed on opposite sides of said tube which are adapted to rotatably support a wheel assembly below said tube and a second slidable frame between said plate members, said second slidable frame being disposed within said channel members and adapted to slidably support said tube, a pair of arms extending from said wheels and pivotally connected to said first slidable frame; a pair of arms extending from said wheels and pivotally connected to said plate members; means fixedly secured to said first and second slidable frames for angularly adjusting the position of said tube; means fixedly secured to said second slidable frame and to said channel members for longitudinally extending and retracting said tube; motive means coupled to said wheel assembly for driving the same so that said conveyor structure is transportable; and means coupled to said wheel assembly for rotating the same so that said conveyor structure is steerable.

12. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a pair of laterally spaced plate members disposed on opposite sides of said tube which are adapted to support a wheel assembly below said tube and a second slidable frame between said plate members, said second slidable frame being disposed within said channel members and adapted to slidably support said tube; a pair of arms extending from said wheels and pivotally connected to said first slidable frame; a pair of arms extending from said wheels and pivotally connected to said plate members; hydraulic cylinder means fixedly secured to said first and second slidable frames for angularly adjusting the position of said tube; hydraulic cylinder means fixedly secured to said second slidable frame and to said channel members for longitudinally extending and retracting said tube; a hydraulic motor means coupled to said wheel assembly for driving the same to transport said conveyor structure; a steering assembly including hydraulic cylinder means coupled to said wheel assembly for steering said conveyor structure.

13. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a pair of laterally spaced plate members disposed on opposite sides of said tube which are adapted to support a wheel assembly below said tube and a second slidable frame between said plate members, said second slidable frame being disposed within said channel members and adapted to slidably support said tube; a pair of arms extending from said wheels and pivotally connected to said first slidable frame; a pair of arms extending from said wheels and pivotally connected to said plate members; means fixedly secured to said first and second slidable frames for angularly adjusting the position of said tube; means fixedly secured to said second slidable frame and to said channel members for longitudinally extending and retracting said tube; a pair of conveyors laterally disposed on opposite sdies of said elongated tube for conveying material to the conveyor screw therein, each of said conveyors being adapted to be pivoted horizontally and vertically so as to be angularly positionable as desired; and means coupled to each of said conveyors for pivoting said conveyors horizontally and vertically.

14. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a wheel assembly adapted to slidably support said tube including steering means for steering said wheel assembly, driving means for driving the wheel thereof to move said conveyor structure and means for pivoting said wheel assembly to raise and lower the input end of said tube; a second slidable frame disposed within said channel members; a pair of arms extending from said wheels and pivotally connected to said first slidable frame; a pair of arms extending from said wheels and pivotally connected to said wheel assembly; means fixedly secured to said first and second slidable frames for angularly adjusting the position of said tube; means fixedly secured to said second slidable frame and to said channel members for longitudinally extending and retracting said tube; and means coupled to said conveyor screw for rotating it.

15. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a wheel assembly adapted to slidably support said tube; hydraulic motor means coupled to said wheel assembly for driving a wheel thereof; steering means including a hydraulic cylinder means coupled to said wheel assembly for turning the same; a second slidable frame being disposed within said channel members; a pair of arms extending from said wheels and pivotally connected to said wheel assembly; hydraulic cylinder means fixedly secured to said first and second slidable frames for angularly adjusting the position of said tube; hydraulic cylinder means fixedly secured to said second frame and to said channel members for longitudinally extending and retracting said tube; a hydraulic pump; means coupling said pump to said hydraulic cylinders and said hydraulic motor including valve means for independtly operating said cylinders and said motor; and motor means coupled to said conveyor screw and to said hydraulic pump for rotating said conveyor screw and for operating said hydraulic pump.

16. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a pair of laterally spaced plate members disposed on opposite sides of said tube; a second slidable frame secured between said plate members and disposed within said channel members and adapted to slidably support said tube; a pair of arms extending from said wheels and pivotally connected to said first slidable frame; a pair of arms extending from said wheels and pivotally connected to said plate members; means fixedly secured to said first and second slidable frames for angularly adjusting the position of said tube; means fixedly secured to said second slidable frame and to said channel members for longitudinally extending and retracting said tube; a wheel assembly disposed below said tube and rotatably secured to said plate members; steering means coupled to said wheel assembly including a gear secured to a wheel supporting shaft, a driven gear rotatably supported, a chain drivingly engaged with said gears, a shaft having a chain engaging lug thereon adapted to be moved transversely to cause said chain to move to rotate said gears and means for moving said shaft transversely; and means coupled to said conveyor screw for rotating it.

17. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a pair of laterally spaced plate members disposed on opposite sides of said tube; a second slidable frame secured between said plate members and disposed within said channel members and adapted to slidably support said tube; a pair of arms extending from said wheels and pivotally connected to said first slidable frame; a pair of arms extending from said wheels and pivotally connected to said plate members; a hydraulic cylinder fixedly secured to said first and second slidable frames for angularly adjusting the position of said tube; a hydraulic cylinder fixedly secured to said second slidable frame and to said channel members for longitudinally extending and retracting said tube; a wheel assembly disposed below said tube and rotatably secured to said plate members; a hydraulic motor drivingly coupled to said wheel of said wheel assembly; a steering assembly coupled to said wheel of said wheel assembly; a steering wheel coupled to said wheel assembly including a hydraulic cylinder; a hydraulic pump; reservoir means disposed below said tube and pivotally secured thereto; hydraulic lines including valve means coupling said reservoir means, said pump and said hydraulic motor and cylinders, said valve means being operable to operate said components individually; and motor means coupled to said hydraulic pump and to said conveyor screw for operating said hydraulic pump and to rotate said conveyor screw.

18. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a pair of laterally spaced plate members disposed on opposite sides of said tube which are adapted to support a wheel assembly below said tube and a second slidable frame between said plate members, said second slidable frame being disposed within said channel members and adapted to slidably support said tube; a pair of arms extending from said wheels and pivotally connected to said first slidable frame; a pair of arms extending from said wheels and pivotally connected to said plate members; means fixedly secured to said first and second slidable frames for angularly adjusting the position of said tube; means fixedly secured to said second slidable frame and to said channel members for longitudinally extending and retracting said tube; a pair of conveyors laterally disposed on opposite sides of said tube and adapted to be pivoted horizontally and vertically, each of said conveyors including a conveyor screw rotatably supported therein; and means coupled to said conveyor screws for rotating them.

19. A conveyor structure comprising an elongated tube having a conveyor screw rotatably supported therein; a pair of ground wheels; a pair of laterally spaced inwardly facing channel members disposed below said tube and rigidly secured thereto; a first slidable frame disposed within said channel members; a pair of laterally spaced plate members disposed on opposite sides of said tube which are adapted to support a wheel assembly below said tube and a second slidable frame between said plate members, said second slidable frame being disposed within said channel members and adapted to slidably support said tube; a pair of arms extending from said wheels and pivotally connected to said first slidable frame; a pair of arms extending from said wheels and pivotally connected to said plate members; means fixedly secured to said first and second slidable frames for angularly adjusting the position of said tube; means fixedly secured to said second slidable frame and to said channel members for longitudinally extending and retracting said tube; a laterally disposed conveyor support assembly secured to the input end of said tube including a pair of complementary shaped members adapted to be secured about said tube, a pair of shafts disposed on opposite sides of said members and fixedly secured thereto in parallel spaced relation, a pivot support structure having a first pair of arms each of which pivotally supports a conveyor retaining ring and a second pair of arms each of which supports a pivotal mounting member, a pair of conveyors each having one end thereof pivotally secured within respective ones of said conveyor retaining rings and adapted to extend laterally therefrom; means coupled to each of said conveyors and said shafts for horizontally pivoting said conveyors, means coupled to each of said conveyors and said pivotal mounting members for vertically pivoting said conveyors and a conveyor screw rotatably supported in each of said conveyors; and means coupled to said conveyor screws for rotating them.

References Cited by the Examiner

UNITED STATES PATENTS

| 2,430,945 | 11/1947 | O'Brien | 198—120.5 |
| 2,606,643 | 8/1952 | Tidwell | 198—9 |
| 2,640,577 | 6/1953 | Roscoe | 198—9 |
| 2,808,920 | 10/1957 | Sitver | 198—9 |

FOREIGN PATENTS 721,672  11/1930  France.

EVON C. BLUNK, *Primary Examiner.*

EDWARD A. SROKA, *Examiner.*